Oct. 23, 1934.  G. A. TUCK  1,977,783
HEATING FURNACE
Filed Aug. 29, 1931   2 Sheets-Sheet 1

INVENTOR.
GEORGE A. TUCK
BY
White, Prost, Flehr & Lothrop
ATTORNEYS.

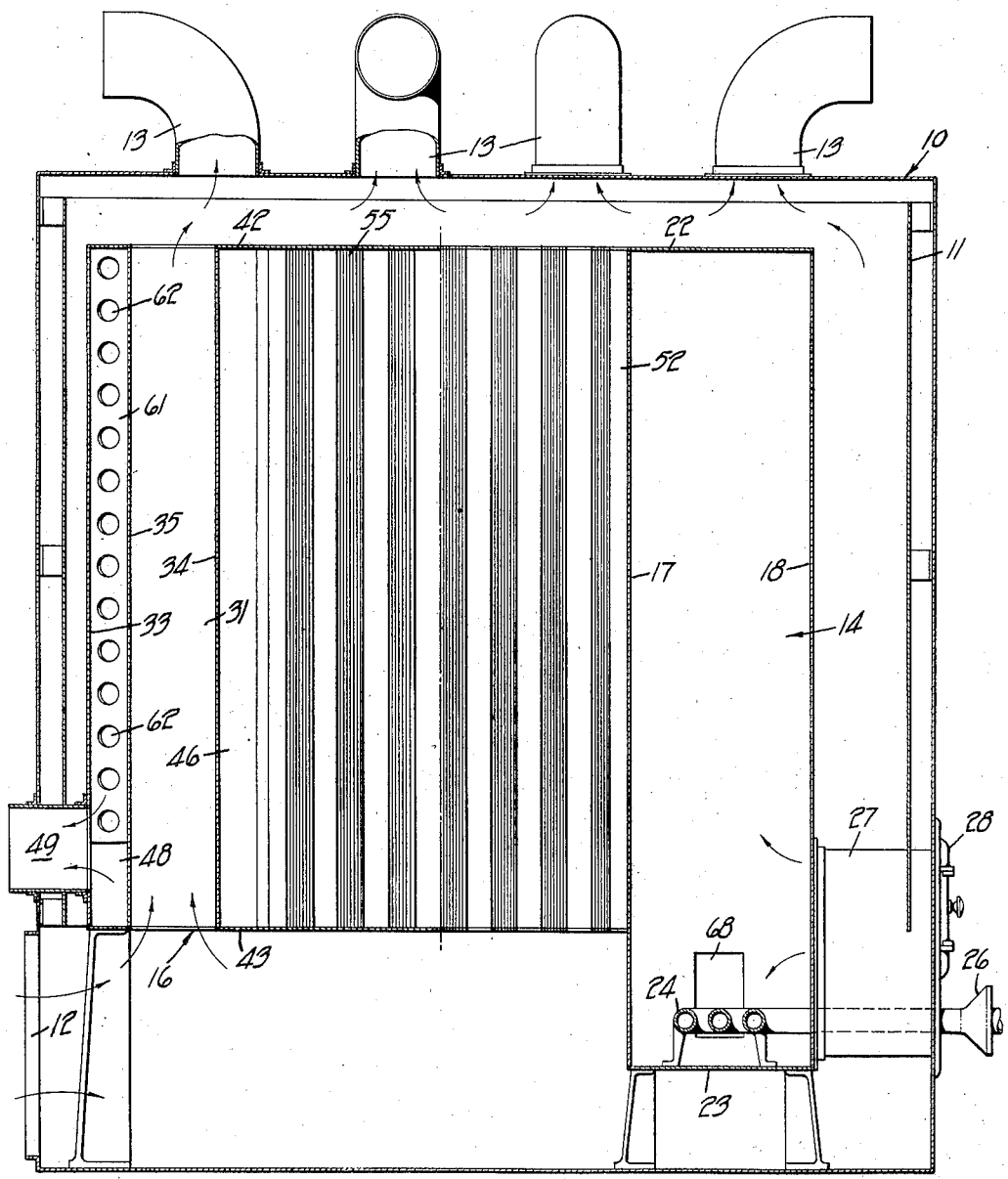

Patented Oct. 23, 1934

1,977,783

UNITED STATES PATENT OFFICE 1,977,783

HEATING FURNACE

George A. Tuck, San Francisco, Calif.

Application August 29, 1931, Serial No. 560,089

3 Claims. (Cl. 126—108)

This invention relates generally to hot air furnaces such as are commonly employed for domestic heating purposes. It is adapted particularly for use with gaseous fuel.

It is an object of the invention to generally improve upon furnaces of the above type, particularly with respect to securing more adequate distribution of heat to hot air delivery conduits connected with the same.

It is a further object of the invention to devise an improved hot air furnace for utilizing gaseous fuel, which will so control flow of products of combustion as to prevent smothering of the flame after ignition, and which will also make possible relatively high efficiency and adequate distribution of heat.

It is a further object of the invention to devise an improved form of hot air heating furnace which will give highly satisfactory overall performance, but which will be relatively inexpensive to manufacture and to install.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Fig. 2 is a cross sectional view taken along the line 2—2 of Fig. 1.

Figure 1:
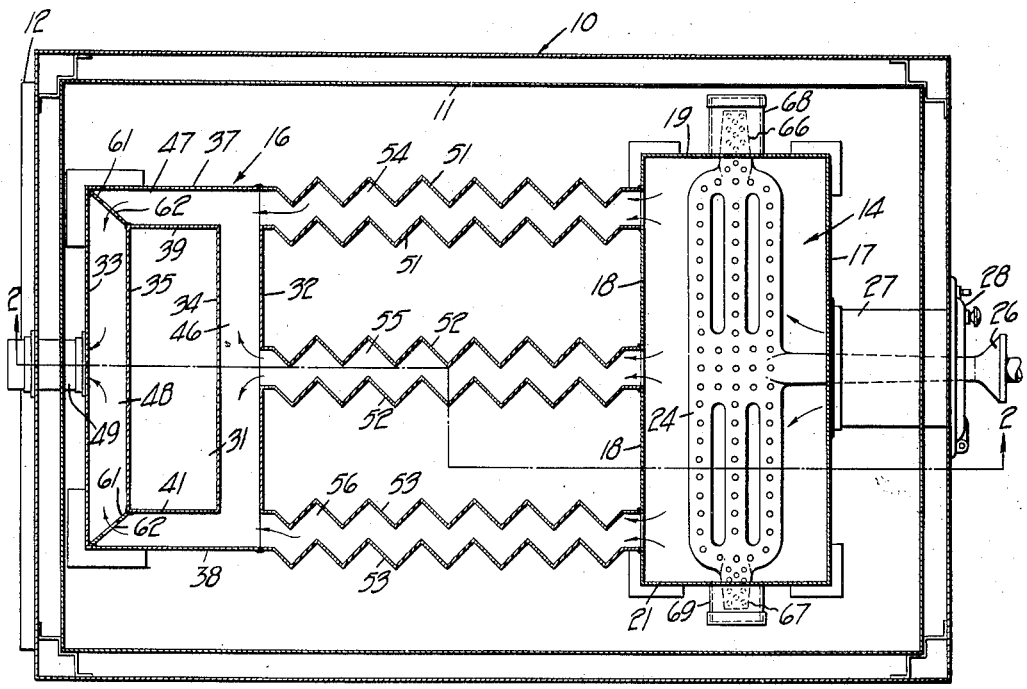
Figure 1 is a plan view, in cross section, illustrating a furnace constructed in accordance with the present invention.

The furnace as illustrated in the drawings consists of an outer casing 10 formed of suitable material, such as sheet metal, and which is provided with an inner sheet metal liner 11. The lower portion of casing 10 is provided with an inflow cold air opening 12, while the upper wall of the casing is connected to a plurality of hot air delivery conduits 13. Positioned within the casing 10 there is a heat transfer unit including a combustion chamber 14, and a header 16.

Combustion chamber 14 can be conveniently made of sheet metal walls, and can be generally rectangular in transverse cross section. The walls include side walls 17 and 18, end walls 19 and 21, and top and bottom walls 22 and 23. A gas burner 24 is positioned within the lower portion of combustion chamber 14, and is supplied with gaseous fuel from an external source thru the air mixer 26. Conduit 27 connects the wall 17 of chamber 14 with the adjacent wall of chamber 10, and is normally closed by an external door 28.

Header 16 can be likewise formed of sheet metal walls, and is provided with an upright open ended passageway 31 for upward flow of air to be heated. With the structure as shown header 16 includes the outer upright side walls 32 and 33, inner upright side walls 34 and 35, outer upright end walls 37 and 38, inner upright end walls 39 and 41, and top and bottom walls 42 and 43. The spaces enclosed by the walls of header 16 form connected flow paths for gaseous products of combustion, these paths being designated in Fig. 1 as being formed by portions 46, 47, and 48. For removing products of combustion from the header, the lower portion of wall 33 is shown connected at its lower portion to a flue 49 or equivalent exhaust conduit.

Interconnecting combustion chamber 14 with header 16, I provide several sets of walls which form flow passages connecting the chamber with the header. Three sets of walls designated in Fig. 1 as 51, 52, and 53, are illustrated, although more sets can be employed if desired. Each wall is preferably made of sheet metal and is arranged in a generally upright position. The walls of each set are so spaced apart as to form passages 54, 55 and 56 for flow of products of combustion. Since the upright walls 51, 52 and 53 are connected to the walls 18 and 32 of the combustion chamber and header respectively, the ends of passages 54, 55 and 56 communicate with both the combustion chamber and the header. In height, walls 51, 52 and 53 are substantially coextensive with header 16, and the upper and lower ends of passageways 54, 55 and 56 are closed by extensions of the top and bottom walls 42 and 43, of the header. Thus air within casing 10 is free to flow upwardly between the sets of walls 51, 52 and 53, and about the same, to absorb heat by contact therewith. To provide greater exposed areas for walls 51, 52 and 53, these walls are preferably provided with vertical fluting as illustrated. This fluting likewise provides a greater surface of contact with the hot products of combustion flowing thru passageways 54, 55 and 56 and flow of gas thru these passageways is impeded in such a manner as to cause more adequate transfer of heat from the gas to the walls 51, 52 and 53.

Without the use of means in addition to that described above, it has been found that heat will not be uniformly or adequately distributed to the walls 51, 52 and 53, and that there will be a tendency for the gas flame to become extinguished shortly after its ignition, due to initial blocking of the natural flow of products of combustion. Such initial blocking is caused by the relatively large space into which the products of combustion are delivered, and in effect tends to bring the products of combustion to a positive stop. These disadvantages are obviated in my furnace by the use of special baffle means for controlling flow of products of combustion. This baffle means is in the form of a pair of baffle plates 61, which are positioned within the header 16, as shown in Fig. 1. These baffle plates extend substantially the entire height of the header, and are provided with a plurality of vertically spaced apertures 62. All products of combustion passing thru header 16 are caused to flow thru apertures 62 of these baffle plates, so that their flow is not only impeded to a certain extent, but flow is distributed over substantially the entire height of the header and of the passages 54, 55 and 56. In other words a flow of gaseous products thru passages 54, 55 and 56, is not only made more truly generally horizontal in direction, but is distributed in such a manner that not only the upper but also the lower portions of walls 51, 52 and 53 are heated. Likewise baffles 61 cushion the air flow, so that the gas flame is stabilized, and is not apt to be extinguished or smothered shortly after lighting the same.

Operation of my furnace will be apparent from the preceding detailed description. Upon lighting the burner 24, hot products of combustion arise from the flame in a vertical column thru combustion chamber 14. Along the height of this column the gaseous products are diverted thru the passageways 54, 55 and 56, and delivered to the interior of header 16. From this header they are removed thru flue 49. The metal walls 51, 52 and 53 and also the metal walls of the combustion chamber and of the header, are heated to a substantial degree, thus causing heat to be imparted to air within casing 10. Hot air in casing 10 flows outwardly thru the hot air delivery conduits 13, and cold air flows inwardly thru opening 12.

It is characteristic of many hot air furnaces that the walls immediately surrounding the combustion chamber transfer the majority of the heat absorbed by air passing thru the furnace casing. This generally results in loss in efficiency and unequal distribution of heat to the hot air delivery conduits. With my construction heat is fairly equally proportioned between the walls of the combustion chamber, the walls 51, 52 and 53, and the walls of the header 16, so that substantially equal heat units can be delivered to several delivery conduits. Baffles 61 not only effect better distribution of heat, but also stabilize the gas flame and prevent the same from being extinguished or smothered shortly after ignition, as has been previously explained.

The character of the furnace which I have described above makes it possible to make installations of different capacities, with a minimum of alterations. Thus if an installation of twice the capacity of the installation described is desired, two complete inner units are installed side by side, and the casing 10 is made sufficiently large to house both units. To make such installations more convenient, I have shown portions 66 and 67 extending from the ends of burner 24. Normally these portions are disposed within sheet metal enclosures 68 and 69, mounted upon the end walls 19 and 21 of combustion chamber. In installing one heat transfer unit beside another, enclosures 68 and 69 of the two units are caused to communicate, thus permitting a projecting portion of one burner to abut the projecting burner of the adjacent unit. Thus only a single pilot flame is required for the burners of both units, as ignition of one burner will ignite the other.

I claim:

1. In a hot air heating furnace, a generally upright combustion chamber in which fuel can be burned, a generally upright header adapted to receive products of combustion and to deliver the same to a flue, both said header and said chamber being made of metal walls and being spaced laterally apart, the metal walls of said header serving to form an inner upright open ended passage for flow of air, a plurality of vertical spaced metal walls connecting said chamber and said header, said walls being formed to provide at least three flow passages for products of combustion flowing from said chamber to said header, two of said flow passages communicating thru one side wall of said header along the upright edges thereof, and the third flow passageway communicating thru said side wall along an intermediate portion of the same, a pair of upright baffle plates disposed within said header and having vertically spaced apertures thru which products of combustion are caused to flow, and an air flow casing surrounding said chamber, said header, and said connecting walls.

2. In a hot air heating furnace, a generally upright combustion chamber in which fuel can be burned, a generally upright header adapted to receive products of combustion and to deliver the same to a flue, both said chamber and said header being made of metal walls and being spaced laterally apart, a plurality of generally upright spaced metal walls connecting said chamber and said header, said walls forming a plurality of spaced flow paths for products of combustion flowing from said chamber to said header, said paths being of substantial height compared to the spacing between the connecting walls, and baffle means positioned within said header for controlling flow of products of combustion whereby such flow is distributed throughout the height of said paths, said baffle means including at least one vertically extending plate disposed within said header and spaced beyond the ends of said paths, said plate being provided with vertically spaced apertures thru which the products of combustion are caused to flow.

3. In a hot air heating furnace, a generally upright combustion chamber in which fuel can be burned, a generally upright header adapted to receive products of combustion and to deliver the same to a flue, both said chamber and said header being made of metal walls and being spaced laterally apart, a plurality of generally upright spaced metal walls connecting said chamber and said header, said walls being made of corrugated sheet metal and forming a plurality of spaced flow paths for products of combustion flowing from said chamber to said header, said walls also forming passages intervening between said paths for upward flow of air being heated, the paths being of substantial height compared to the spacing between the connecting walls, and baffle means positioned within said header for controlling flow of products of combustion whereby such flow is distributed throughout the height of said paths, said baffle means including at least one vertically extending plate disposed within said header and spaced beyond the ends of said paths, said plate being provided with vertically spaced apertures thru which the products of combustion are caused to flow.

GEORGE A. TUCK.